United States Patent
Nagai et al.

[11] Patent Number: 6,163,123
[45] Date of Patent: Dec. 19, 2000

[54] METHOD FOR CONTROLLING ELECTRIC ACTUATOR AND APPARATUS FOR THE SAME

[75] Inventors: Shigekazu Nagai, Tokyo; Masayuki Nakamura; Kazuyuki Oguma, both of Ibaraki-ken, all of Japan

[73] Assignee: SMC Kabushiki Kaisha, Tokyo, Japan

[21] Appl. No.: 09/167,721

[22] Filed: Oct. 7, 1998

[30] Foreign Application Priority Data

Oct. 20, 1997 [JP] Japan ................................ 9-287451

[51] Int. Cl.⁷ .................................................. H02K 7/06
[52] U.S. Cl. ........................ 318/560; 318/254; 400/216; 395/141
[58] Field of Search ............................ 318/560, 254, 318/561, 138, 468; 346/134, 136; 355/308, 309; 400/734, 63, 216, 706, 216.1, 210.2, 279, 705.1, 56, 17, 55, 21, 54, 65; 395/141, 150, 140, 142; 364/519

[56] References Cited

U.S. PATENT DOCUMENTS

| | | | |
|---|---|---|---|
| 4,624,546 | 11/1986 | Fukushi et al. | 355/14 R |
| 4,748,387 | 5/1988 | Tanuma et al. | 318/254 |
| 4,906,114 | 3/1990 | Tanaka et al. | 400/17 |
| 4,933,875 | 6/1990 | Kojima | 364/519 |
| 4,974,068 | 11/1990 | Hiramatsu et al. | 358/75 |
| 5,019,840 | 5/1991 | Watanabe et al. | 346/134 |
| 5,020,005 | 5/1991 | Fujii | 364/519 |
| 5,474,392 | 12/1995 | Matsuoka | 400/56 |
| 5,476,331 | 12/1995 | Ohama | 400/216 |
| 5,524,189 | 6/1996 | Hayama | 395/141 |

FOREIGN PATENT DOCUMENTS 8-280154  10/1996  Japan.

*Primary Examiner*—Paul Ip
*Attorney, Agent, or Firm*—Paul A. Guss

[57] ABSTRACT

Rotary motion of a motor of an electric actuator is converted into rectilinear motion with a small sliding resistance by the aid of a ball screw and a feed nut. On the other hand, a control apparatus for controlling the electric actuator comprises memory groups composed of memories to indicate displacement positions of a displacement member. The memory groups include a starting point memory. If a controller selects the starting point memory, the control apparatus displaces the displacement member to a starting point position. Therefore, it is unnecessary to provide any dedicated signal line for displacing the displacement member to the starting point position. It is possible to decrease the number of signal lines connected to the control apparatus.

11 Claims, 15 Drawing Sheets

FIG. 9

| | MEMORY 98a<br>STARTING POINT MEMORY 99a | MEMORY 98b<br>POSITIVE DIRECTION MOVEMENT MEMORY 99b | MEMORY 98c<br>NEGATIVE DIRECTION MOVEMENT MEMORY 99c | MEMORY 98d<br>VELOCITY INFORMATION MEMORY 99d |
|---|---|---|---|---|
| MEMORY GROUP 96a | | | | |
| MEMORY GROUP 96b | POSITION | POSITION | POSITION | POSITION |
| MEMORY GROUP 96c | POSITION | POSITION | POSITION | POSITION |
| MEMORY GROUP 96d | POSITION | POSITION | POSITION | POSITION |
| MEMORY GROUP 96e | POSITION | POSITION | POSITION | POSITION |
| MEMORY GROUP 96f | POSITION | POSITION | POSITION | POSITION |
| MEMORY GROUP 96g | POSITION | POSITION | POSITION | POSITION |
| MEMORY GROUP 96h | POSITION | POSITION | POSITION | POSITION |

92

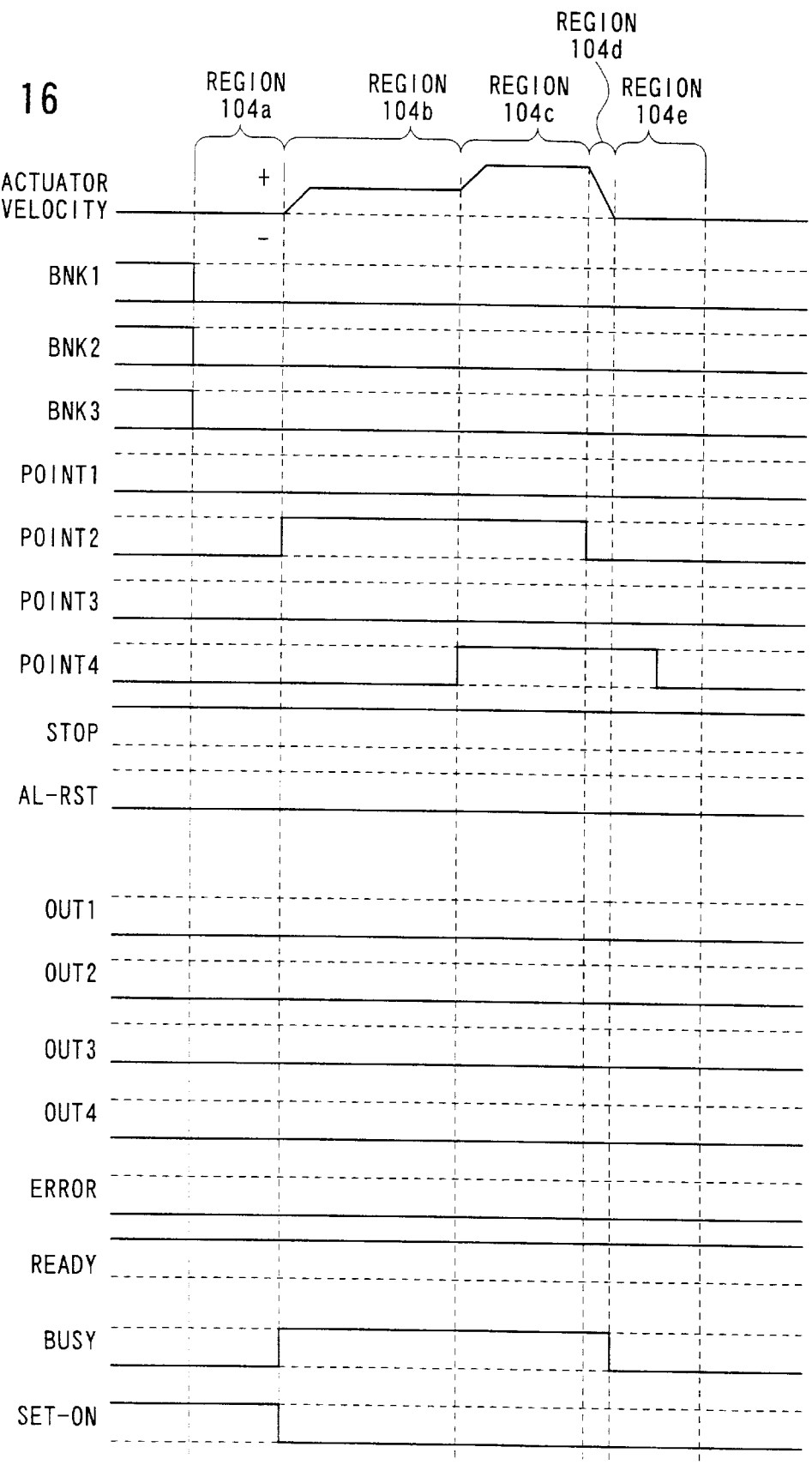

METHOD FOR CONTROLLING ELECTRIC ACTUATOR AND APPARATUS FOR THE SAME

BACKGROUND OF THE INVENTION

1. Field of the Invention

The present invention relates to a control method and an apparatus for the same for controlling a displacement position of a displacement member provided in an electric actuator.

2. Description of the Related Art

An electric actuator has been hitherto used as a means for transporting a workpiece or the like. A control apparatus for controlling the electric actuator is provided with signal lines connected to a controller for selecting an arrival target position of a displacement member, and dedicated signal lines for displacing the displacement member to a position of a starting point.

As described above, the control apparatus for the electric actuator concerning the conventional technique requires the dedicated signal lines. Therefore, a problem arises in that it is necessary to provide a large number of signal lines for the control apparatus.

SUMMARY OF THE INVENTION

A general object of the present invention is to provide a method for controlling an electric actuator and an apparatus for the same which make it possible to decrease the number of signal lines connected to the control apparatus for the electric actuator.

A principal object of the present invention is to provide a method for controlling an electric actuator and an apparatus for the same which make it possible to decrease the number of signal lines connected to a controller by using one of a plurality of memories for storing arrival target positions of a displacement member, as a starting point memory for storing a position of a starting point of the displacement member so that any dedicated signal line is unnecessary to restore the displacement member to the starting point.

Another object of the present invention is to provide a method for controlling an electric actuator and an apparatus for the same which make it possible to prevent the electric actuator from increase in load and eliminate any fear of breakage of the electric actuator by detecting certain displacement of a displacement member when the displacement member is displaced to a starting point or when the displacement member is displaced to a displacement limit disposed on a side opposite to the starting point so that the electric actuator is stopped.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 shows a block diagram illustrating a positional information storage unit of the control apparatus shown in FIG. 8;

FIG. 16 shows the method for controlling the electric actuator according to the embodiment of the present invention, illustrating a time chart to depict a procedure for displacing the slide table in the positive direction.

DESCRIPTION OF THE PREFERRED EMBODIMENTS

The method for controlling the electric actuator and the apparatus for the same according to the present invention will be described in detail below with reference to the accompanying drawings, referring to a preferred embodiment.

Figure 1:
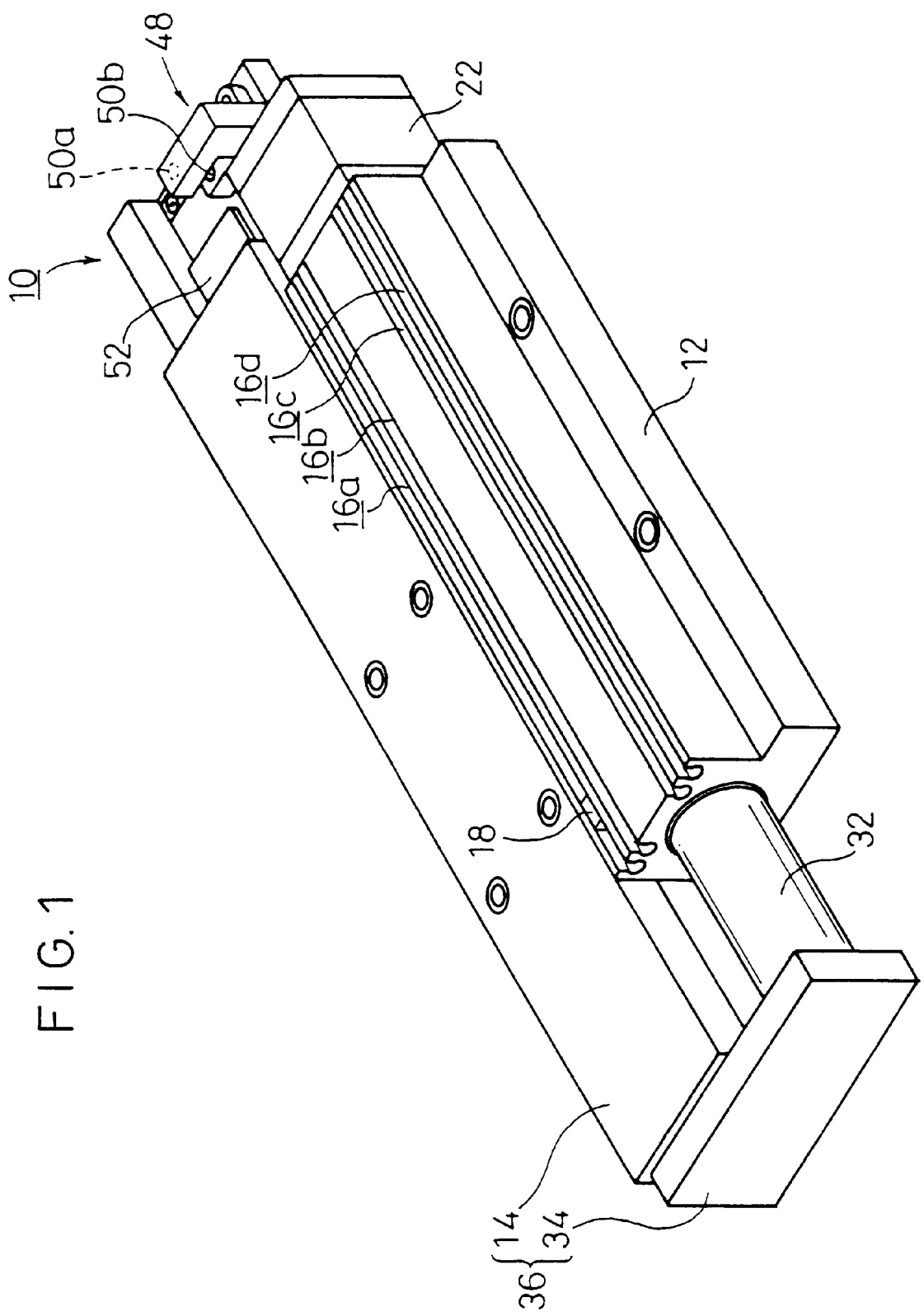
FIG. 1 shows a perspective view illustrating an electric actuator used for a control method according to an embodiment of the present invention.

With reference to FIG. 1, reference numeral 10 indicates an electric actuator to be controlled by a control method according to the embodiment of the present invention. The electric actuator 10 comprises a body 12 which has a lengthy size, and a slide table 14 which is arranged in parallel to the body 12 and which is formed of, for example, aluminum or synthetic resin. A part of the body 12 is formed to expand upwardly along the longitudinal direction. The body 12 has its upper surface which is engraved with four strips of grooves 16a to 16d. A magnetic detection switch 18, which serves as a displacement limit-detecting switch for detecting one displacement limit of the slide table 14, is arranged in any one of the grooves 16a to 16d. A plurality of magnetic detection switches 18 may be provided in the grooves 16a to 16d, if necessary.

Figure 2:
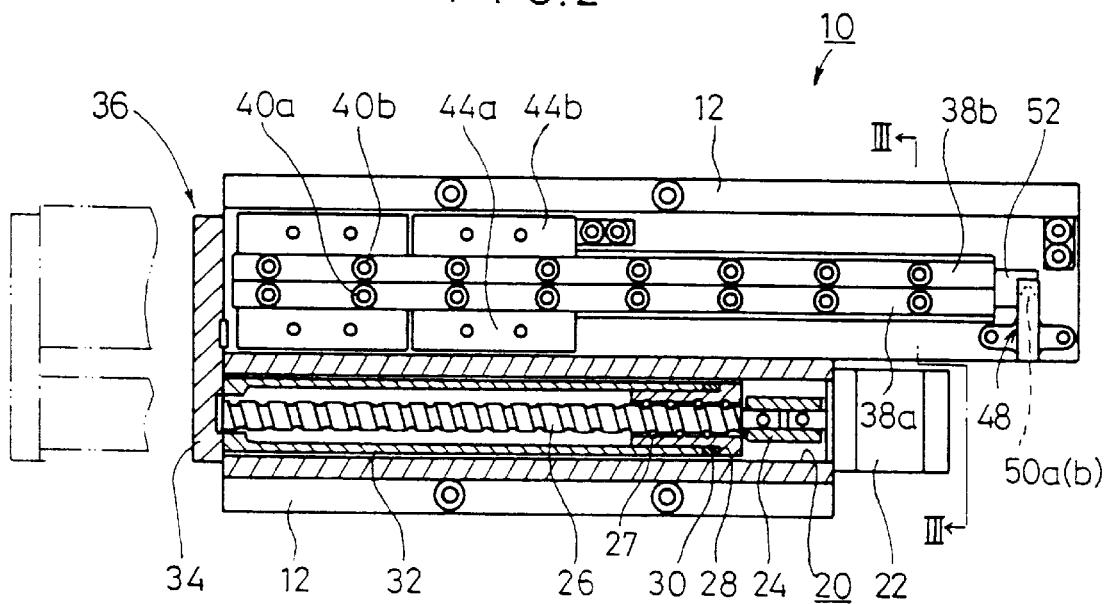
FIG. 2 shows a cross-sectional view illustrating the electric actuator shown in FIG. 1.

A hole 20, which extends along the longitudinal direction of the body 12, is defined in the body 12 (see FIG. 2). A motor 22 such as a stepping motor is secured to one end of the body 12. A ball screw 26, which has, for example, a diameter of 8 mm and a length of 139 mm, is coaxially and rotatably attached to a rotary shaft of the motor 22 via a coupling member 24. Therefore, the ball screw 26 is arranged along the longitudinal direction of the hole 20. A feed nut 28 meshes with the ball screw 26 via a plurality of ball members 27. A magnet 30 to be used for positional detection is provided on the feed nut 28. A cylindrical member 32, which is formed to have a cylindrical configuration with a lengthy size, is slidably fitted to the hole 20. The cylindrical member 32 surrounds the ball screw 26. The cylindrical member 32 is composed of a light metal such as aluminum or a synthetic resin. The feed nut 28 is secured to one end of the cylindrical member 32. A plate-shaped support member 34 is secured to the other end of the cylindrical member 32. The slide table 14 is connected to the support member 34. A displacement member 36 is constructed by the support member 34 and the slide table 14 (see FIG. 1). The support member 34 and the slide table 14 may be formed of a material such as aluminum. Alternatively, when the support member 34 and the slide table 14 are composed of a synthetic resin such as polyimide resin and polyacetal, then the electric actuator 10 has a light weight, and it is possible to decrease the load on the motor 22. For example, the body 12 may be also formed of aluminum or synthetic resin.

Figure 3:
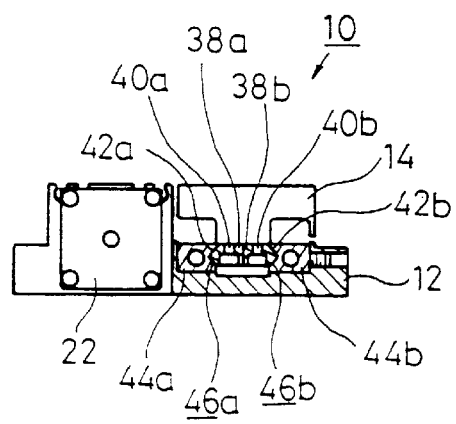
FIG. 3 shows a sectional view taken along a line III—III illustrating the electric actuator shown in FIG. 2.
Figure 4:
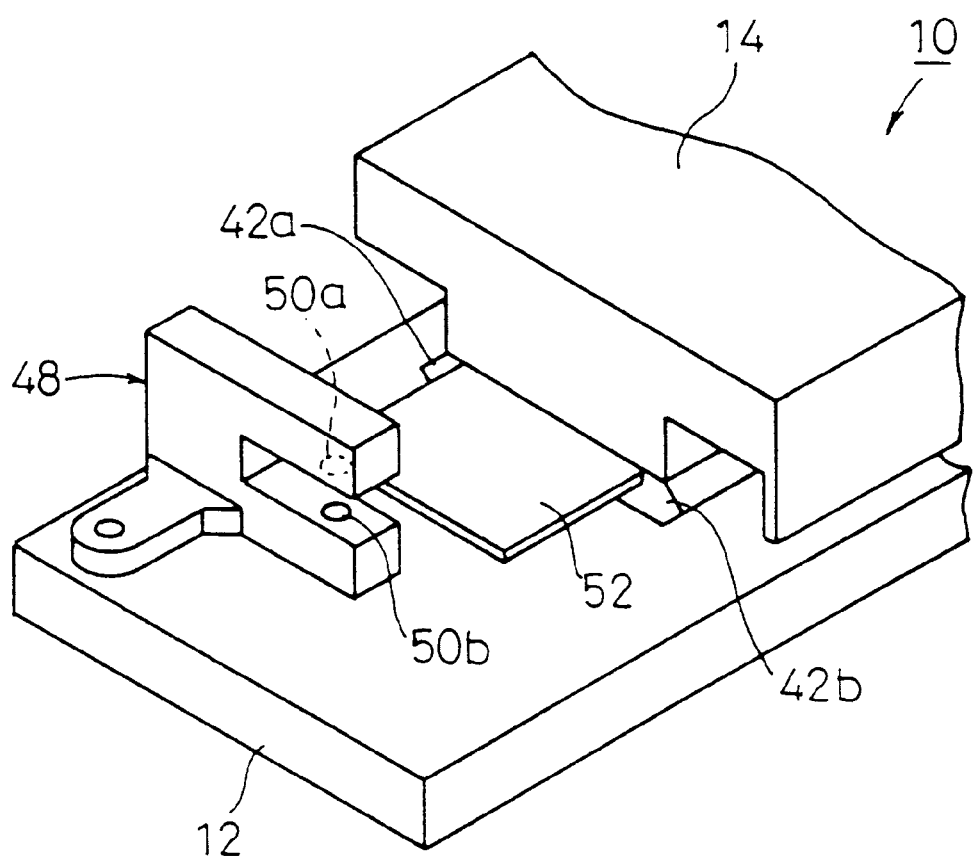
FIG. 4 shows a partially magnified perspective view illustrating a sensor switch of the electric actuator shown in FIG. 1.

As shown in FIG. 3, guide members 38a, 38b are fastened by screws 40a 40b at the lower surface of the slide table 14 along the longitudinal direction. Projections 42a, 42b are formed on both side surfaces of the guide members 38a, 38b. Guide rails 44a, 44b are secured to the upper surface of the body 12, and V-shaped grooves 46a, 46b are defined on the guide rails 44a, 44b. The grooves 46a, 46b are slidably engaged with the projections 42a, 42b. Therefore, a guide means is constructed by the guide members 38a, 38b and the guide rails 44a, 44b. As shown in FIG. 4, an optical sensor switch 48, which serves as a starting point-detecting switch for detecting the position of the starting point of the slide table 14, is provided at an end of the upper surface of the body 12. The optical sensor switch 48 comprises a light-emitting section 50a and a light-receiving section 50b which are opposed to one another. A shielding member 52, which is formed to have a plate-shaped configuration, is provided at the end of the guide members 38a, 38b opposite to the support member 34. When the guide members 38a, 38b slide to the end opposite to the support member 34, the shielding member 52 is inserted into the space between the light-emitting section 50a and the light-receiving section 50b of the optical sensor switch 48.

Figure 5:
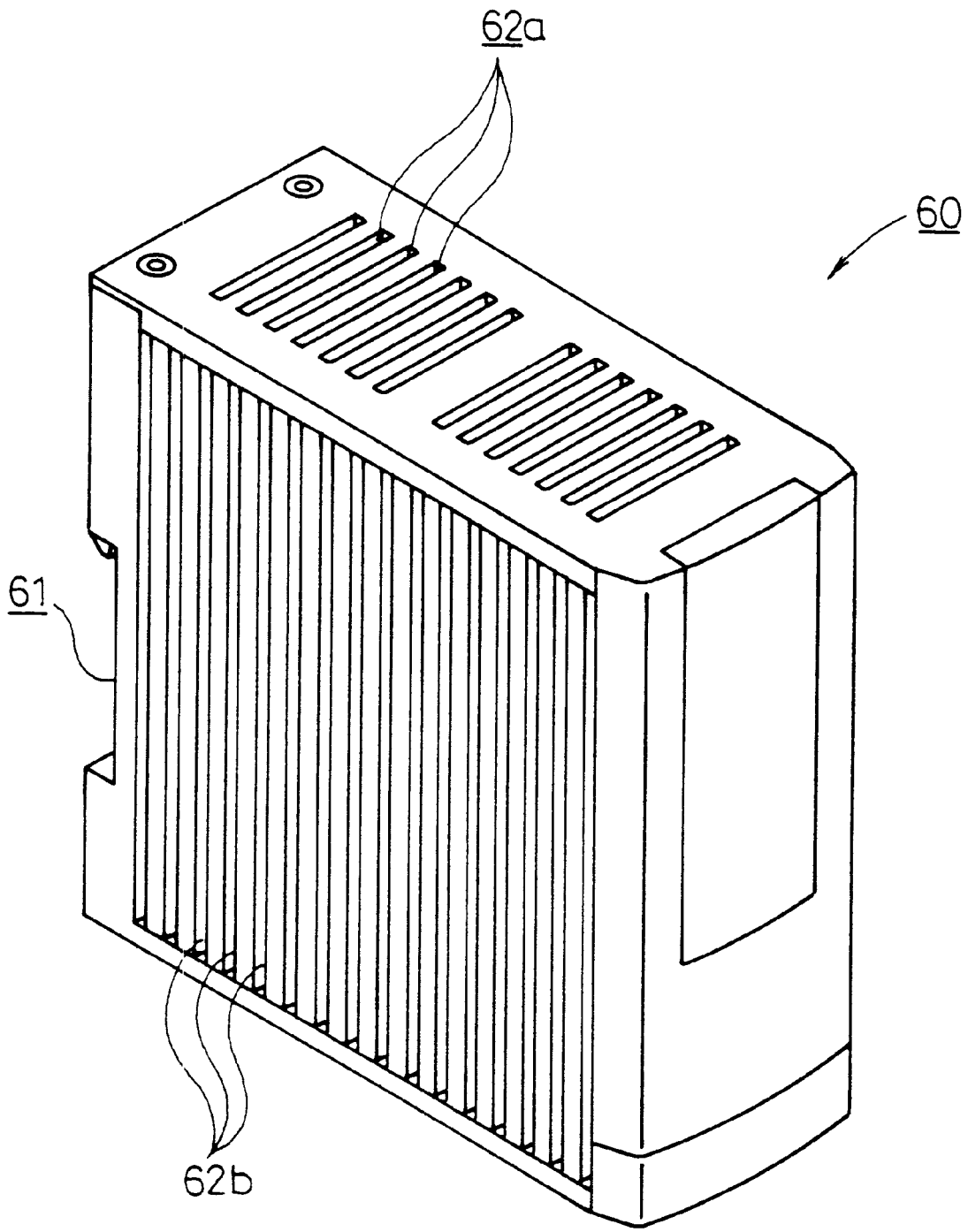
FIG. 5 shows a perspective view illustrating a control apparatus according to the embodiment of the present invention.

Next, explanation will be made with reference to FIG. 5 and the followings for a control apparatus 60 according to the embodiment of the present invention for controlling the electric actuator 10.

Figure 6:
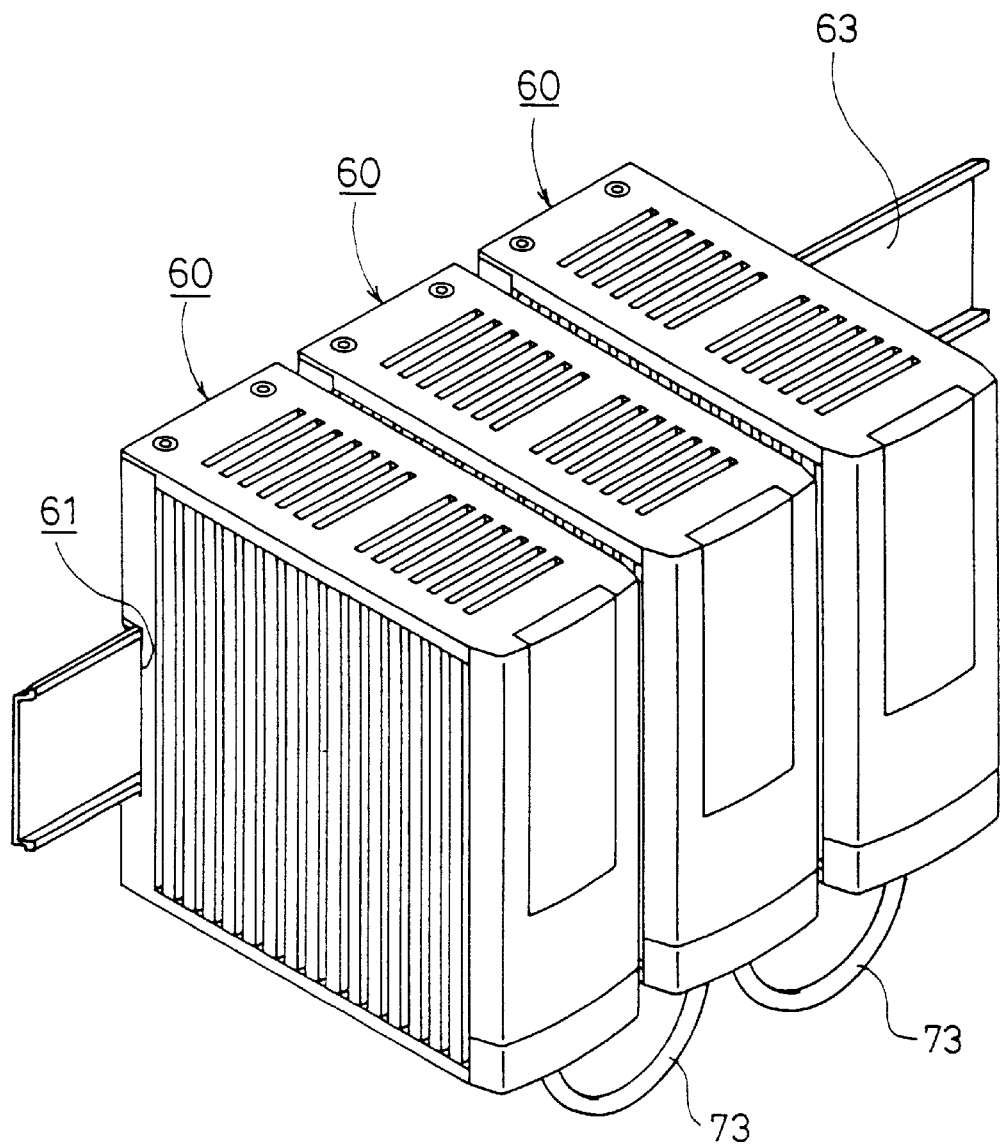
FIG. 6 shows a perspective view illustrating a state in which a plurality of control apparatuses as shown in FIG. 5 are installed to a rail member.
Figure 7:
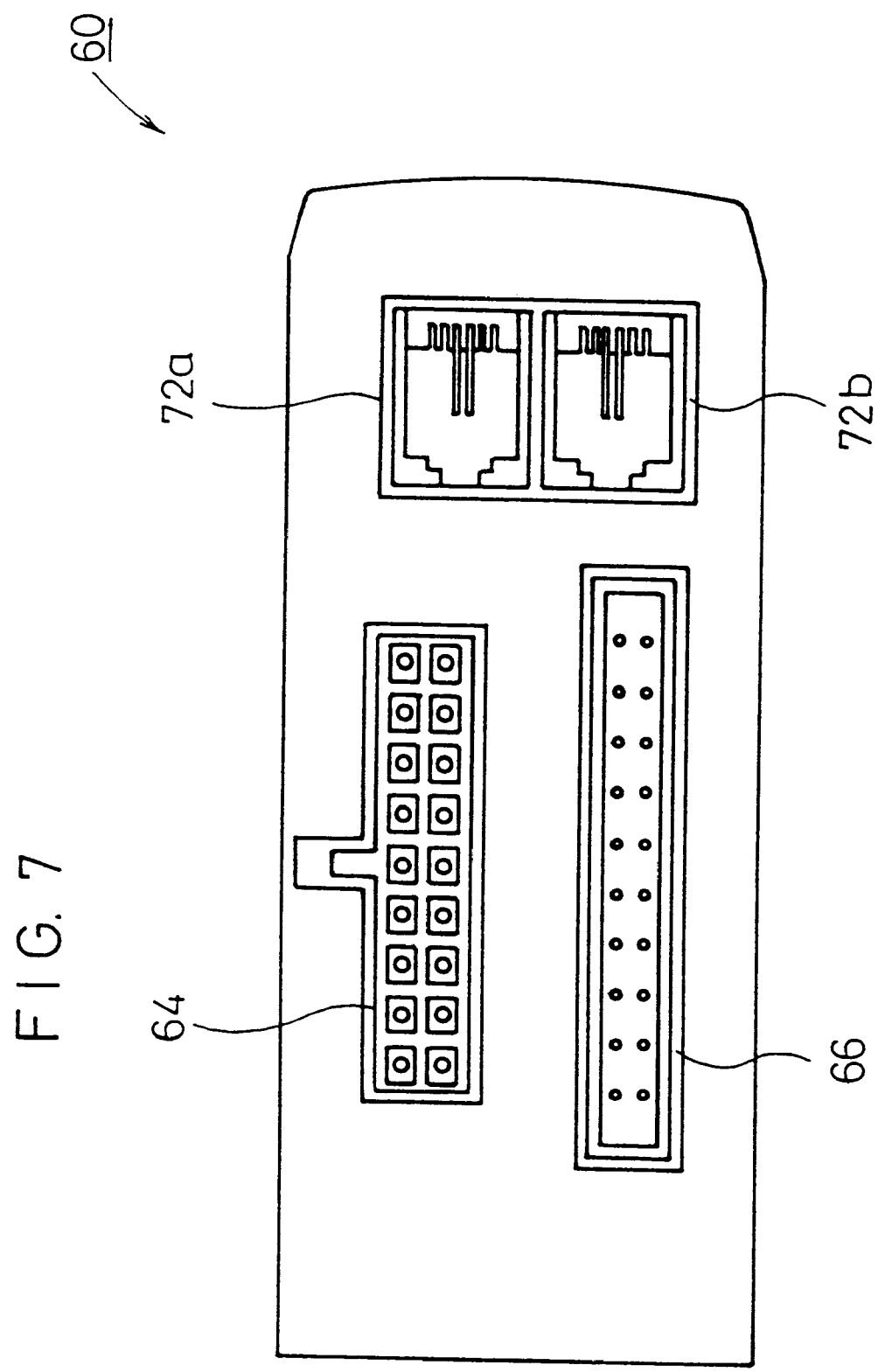
FIG. 7 shows a bottom view illustrating the control apparatus shown in FIG. 5.

The control apparatus 60 is formed to have a substantially rectangular parallelepiped configuration, including a plurality of heat-releasing long holes 62a and heat-releasing fins 62b which are formed at its upper and side surfaces. An engagement groove 61 is formed at the back of the control apparatus 60. As shown in FIG. 6, the engagement grooves 61 are engaged with a rail member 63 to attach the control apparatuses 60 to the rail member 63. In this embodiment, a plurality of control apparatuses 60 may be attached to the rail member 63. As shown in FIG. 7, connectors 64, 66 are provided at the bottom of the control apparatus 60. Each of the connectors 64, 66 is connectable to the electric actuator 10 and the controller 70 (see FIG. 8). Serial communication connectors 72a, 72b are provided at the bottom of the control apparatus 60. The serial communication connectors 72a, 72b are connectable to other control apparatuses 60 or the like by using cables 73 (see FIG. 6).

Figure 8:
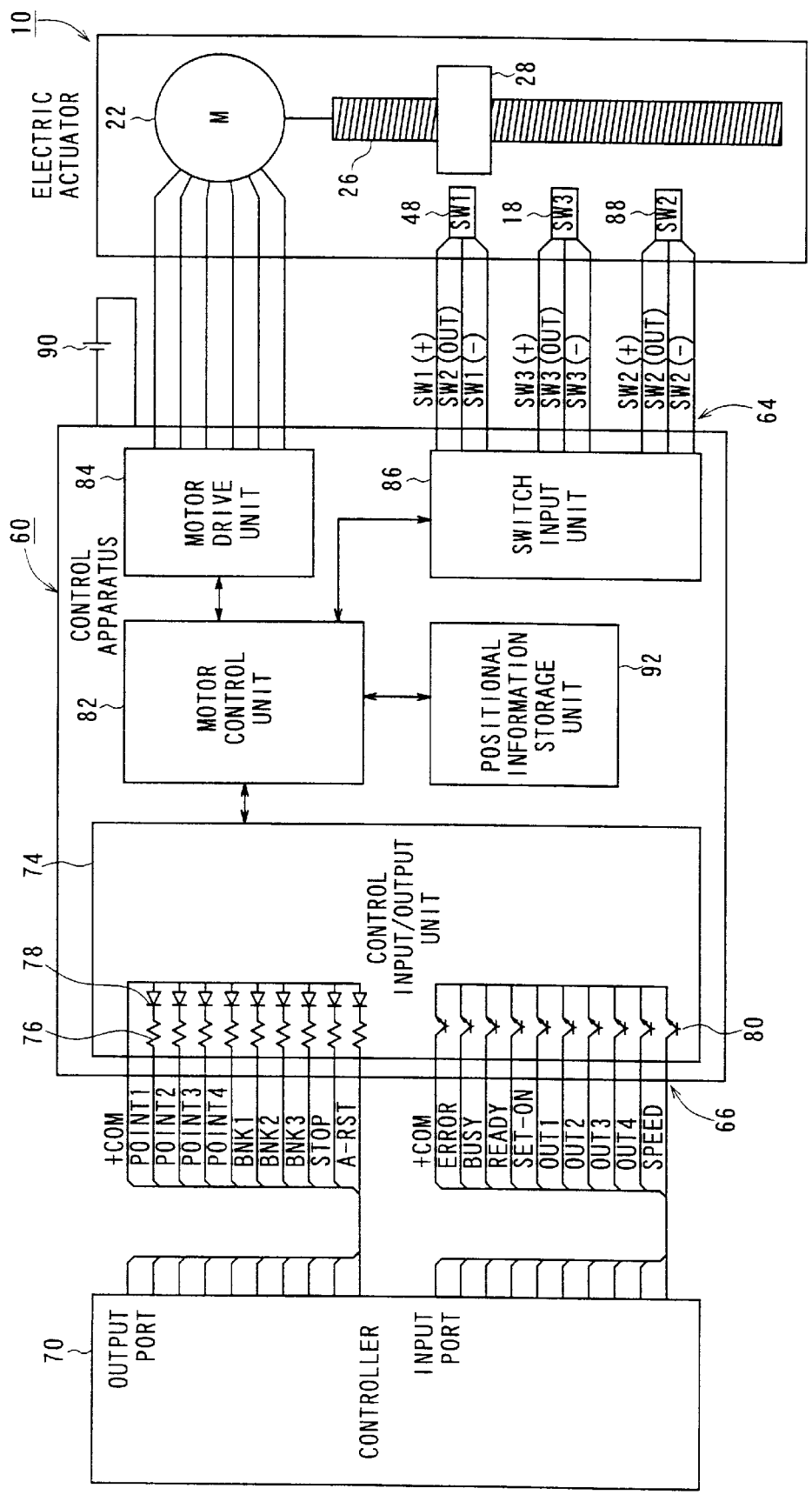
FIG. 8 shows a block diagram illustrating the control apparatus for the electric actuator according to the embodiment of the present invention.

As shown in FIG. 8, the control apparatus 60 comprises therein a control input/output unit 74 to be connected to the connector 66. The control input/output unit 74 is provided with a plurality of resistors 76 and light emitting diodes 78 to serve as input interfaces, and a plurality of phototransistors 80 to serve as output interfaces. A motor control unit 82 is connected to the control input/output unit 74. Signals are sent and received between the motor control unit 82 and the controller 70 via the control input/output unit 74. A motor drive unit 84, which functions as a driver for driving the motor 22, is connected to the motor control unit 82. The motor drive unit 84 is connected to the motor 22 of the electric actuator 10 via the connector 64 so that the driving signal is supplied to the motor 22. A switch input unit 86 is connected to the motor control unit 82. The switch input unit 86 is connected via the connector 64 to the optical sensor switch 48, the magnetic detection switch 18, and a malfunction detection switch 88 of the electric actuator 10. The switch input unit 86 functions as an interface between the motor control unit 82 and the optical sensor switch 48, the magnetic detection switch 18, and the malfunction detection switch 88. A power source unit 90 is connected to the connector 64.

A positional information storage unit 92 is connected to the motor control unit 82. As shown in FIG. 9, the positional information storage unit 92 is comparted into eight memory groups 96a to 96h. Each of the memory groups 96a to 96h comprises four memories 98a to 98d. The memory 98a of the predetermined memory group 96 is used as a starting point memory 99a for storing the position of the starting point of the slide table 14. The memory 98b of the memory group 96a is used as a positive direction movement memory 99b, the memory 98c is used as a negative direction movement memory 99c, and the memory 98d is used as a velocity information memory 99d. Arbitrary positional information for indicating an arrival target position of the displacement member 36 is stored in each of the memories 98a to 98d of the other memory groups 96b to 96h. That is, the control apparatus 60 can store positional information on 28 places.

Any one of the memory groups 96a to 96h is selected depending on the signal inputted from the controller 70 into signal lines BNK1 to BNK3 of the connector 66. Any one of the memories 98a to 98d is selected depending on the signal inputted into signal lines POINT 1 TO POINT 4 of the connector 66 (see FIG. 8). Accordingly, the controller 70 can select any one of the predetermined memories 98a to 98d of the predetermined memory groups 96a to 96h.

In this embodiment, the signal lines BNK1 to BNK3 and the signal lines POINT 1 to POINT4 can be used to select the action of the slide table 14 including, for example, restoration to the starting point, movement in the positive direction, movement in the negative direction, and velocity switching. Therefore, it is possible to decrease the number of signal lines as compared with a case in which dedicated signal lines are provided to restore the slide table 14 to the starting point, and move the slide table 14 in the positive and negative directions. If the number of signal lines is not decreased, the dedicated signal lines can be used as signal lines for indicating positional information. Therefore, it is possible to displace the slide table 14 to a larger number of positions.

The control apparatus 60 for the electric actuator 10 according to the embodiment of the present invention is basically constructed as described above. Next, its operation will be explained below on the basis of flow charts shown in FIGS. 10 to 13, as related to the method for controlling the electric actuator 10 according to the embodiment of the present invention.

At first, the method for restoring the slide table 14 to the starting point will be explained with reference to a time chart shown in FIG. 14.

Figure 10:
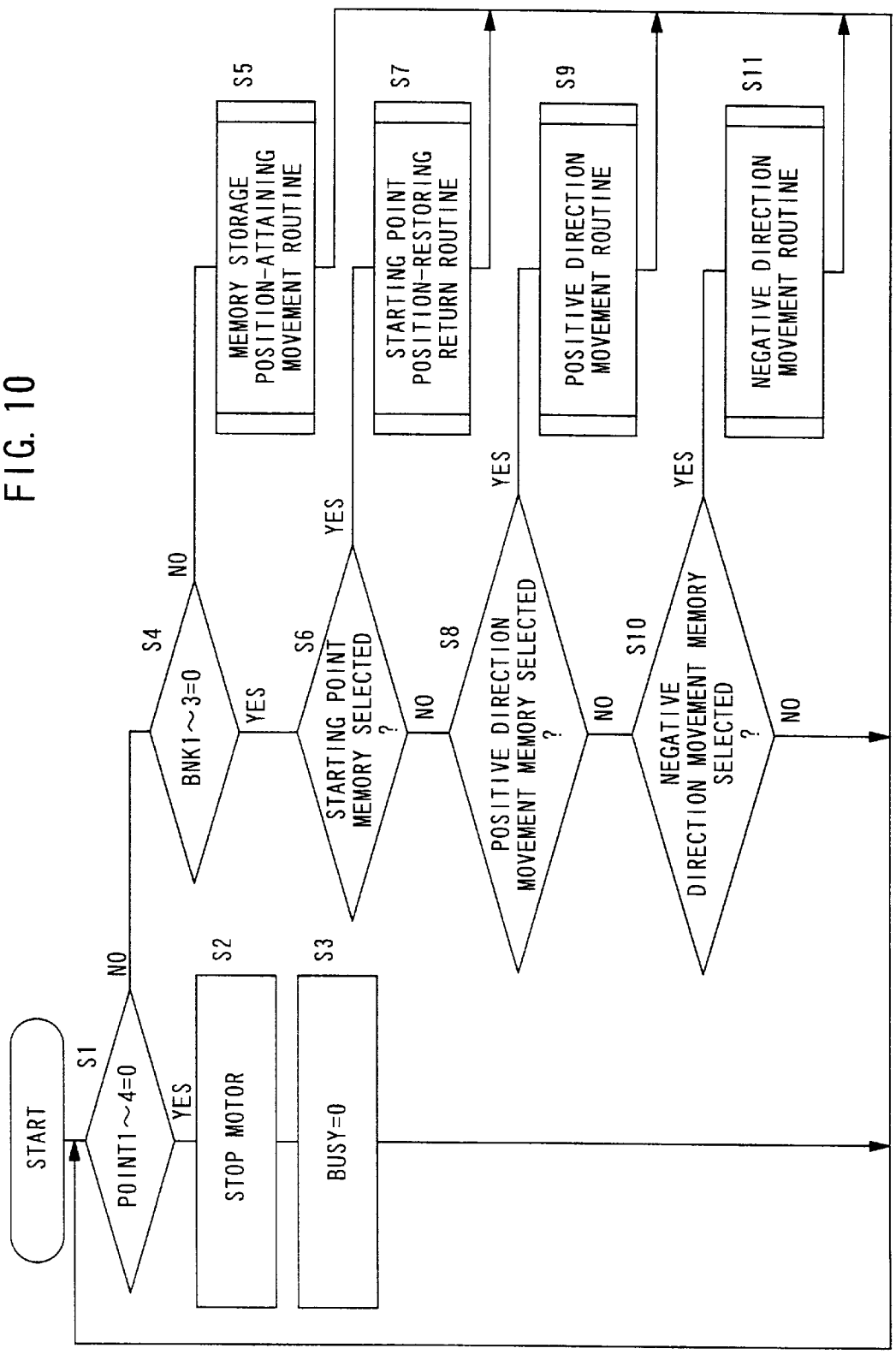
FIG. 10 shows the method for controlling the electric actuator according to the embodiment of the present invention, illustrating a flow chart of a main routine.
Figure 14:
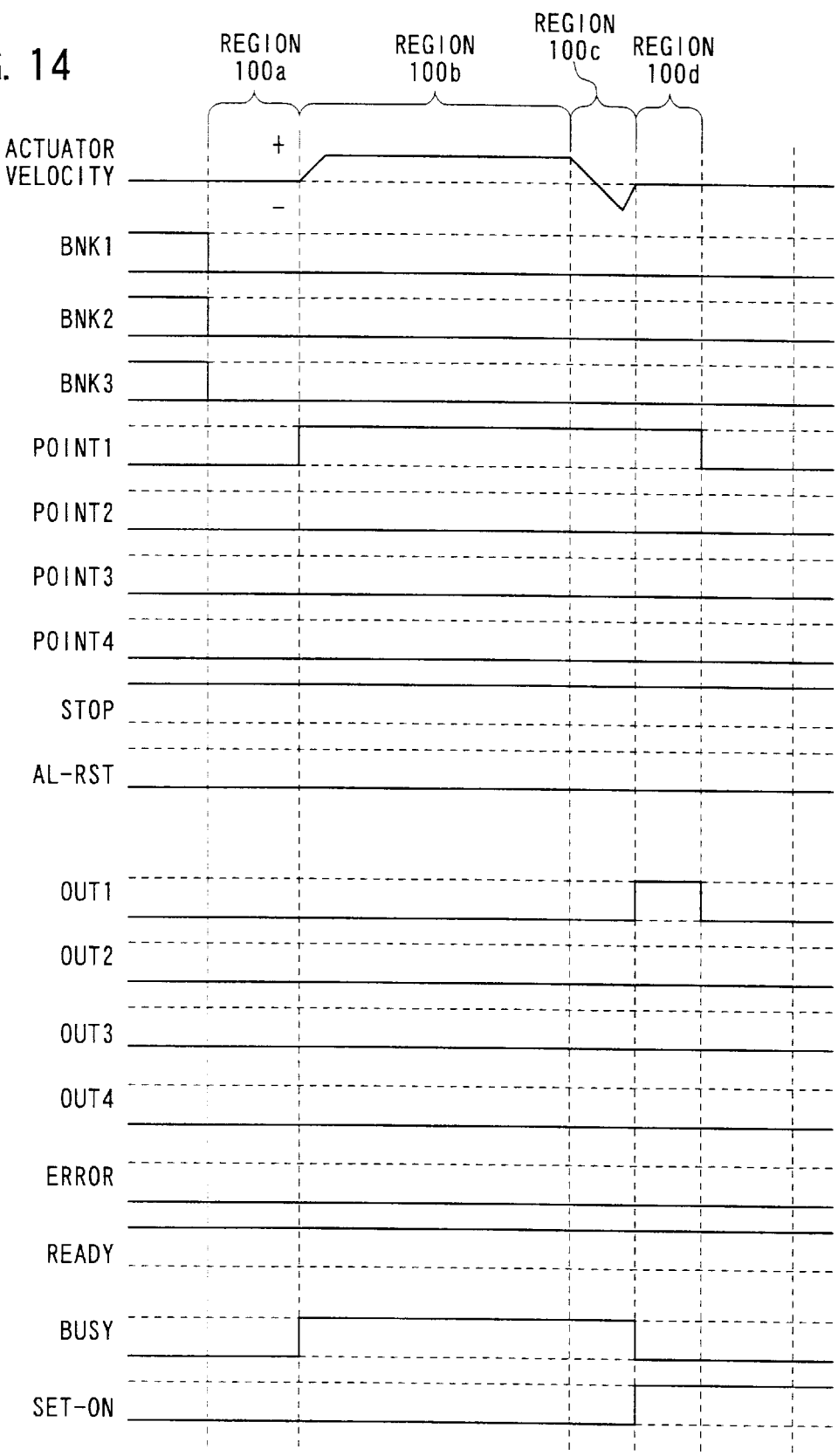
FIG. 14 shows the method for controlling the electric actuator according to the embodiment of the present invention, illustrating a time chart to depict a procedure for restoring a slide table to a starting point.

The controller 70 allows the signal lines BNK1 to BNK3 of the control input/output unit 74 to have "0" to select the memory group 96a of the positional information storage unit 92 (see Region 100a in FIG. 14, FIG. 8, and FIG. 9). At this point of time, the motor control unit 82 checks whether or not all of the signal lines POINT1 to POINT4 have "0" (FIG. 10, step S1). If all of the signal lines POINT1 to POINT4 have "0", then the motor 22 is stopped (step S2), and the signal line BUSY is allowed to have "0" (step S3). Subsequently, the controller 70 allows the signal line POINT1 to have "1" to select the memory 98a, i.e., the starting point memory 99a (Region 100b). Since all of the signal lines POINT1 to POINT4 do not have "0" in the step S1, the motor control unit 82 judges whether or not all of the signal lines BNK1 to BNK3 have "0" (step S4). In this case, since all of the signal lines BNK1 to BNK3 have "0", it is judged whether or not the starting point memory 99a is selected according to the signal lines POINT1 to POINT4 (step S6). In this case, since the starting point memory 99a is selected, the routine proceeds to a starting point position-restoring return routine (step S7).

Figure 11:
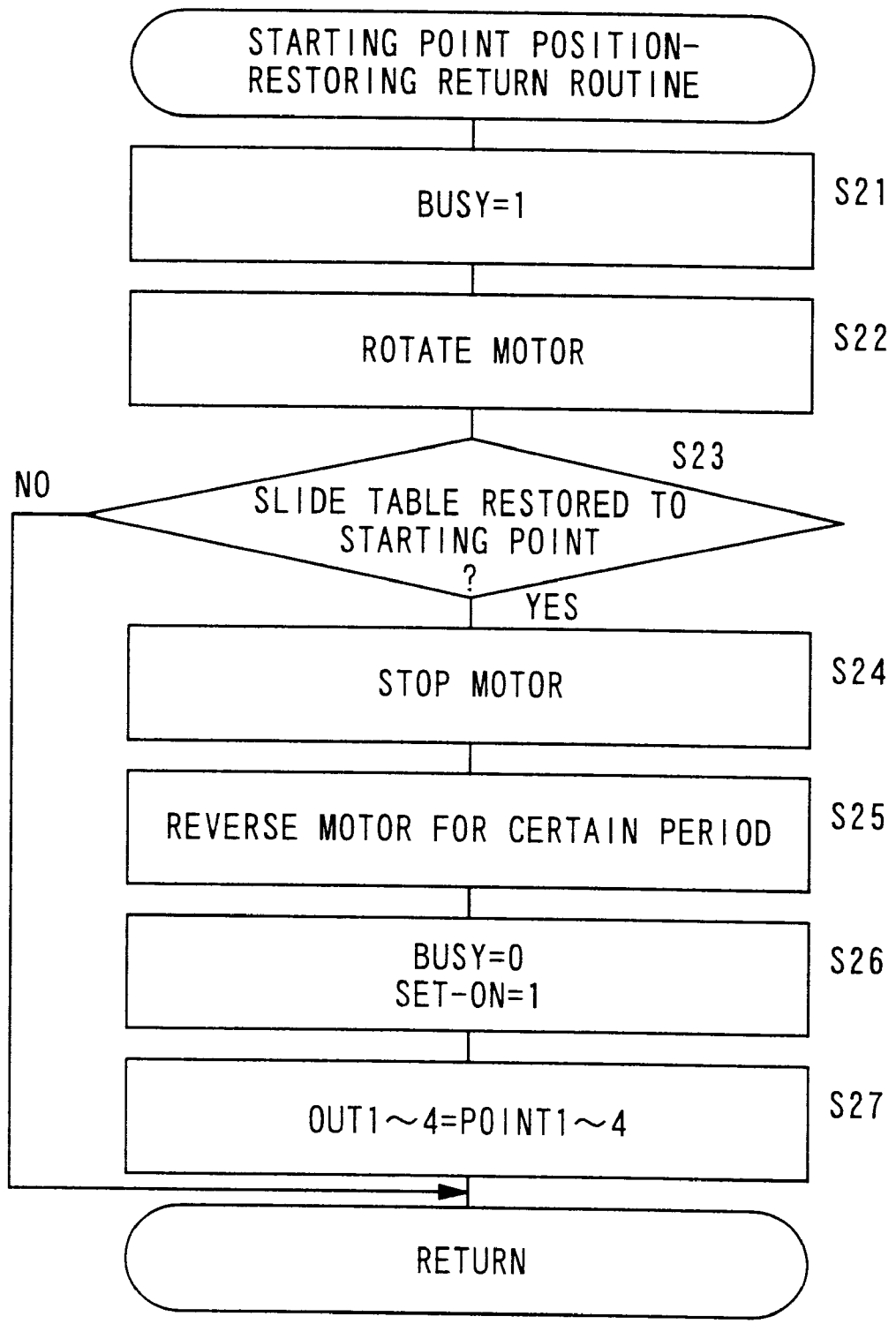
FIG. 11 shows the method for controlling the electric actuator according to the embodiment of the present invention, illustrating a flow chart of a starting point position-restoring return routine.
Figure 12:
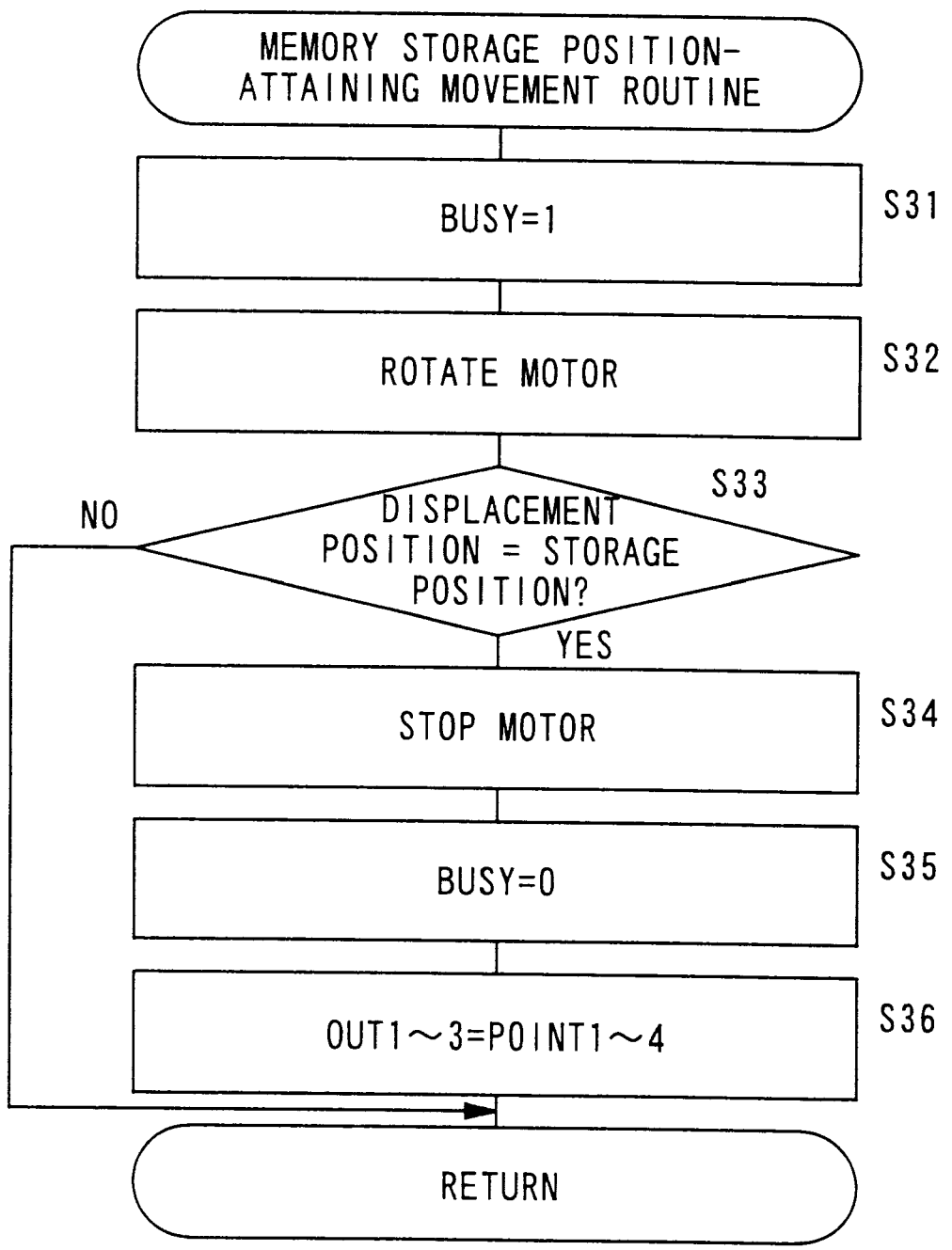
FIG. 12 shows the method for controlling the electric actuator according to the embodiment of the present invention, illustrating a flow chart of a memory storage position-attaining movement routine.

The operation is executed in the starting point position-restoring return routine as shown in FIG. 11. That is, the motor control unit 82 allows the signal line BUSY of the control input/output unit 74 to have "1" to indicate for the controller 70 that the control operation of the electric actuator 10 is started (step S21). The motor drive unit 84 is controlled in order to displace the slide table 14 to the starting point position. The motor drive unit 84 outputs a drive pulse signal to the motor 22 of the electric actuator 10. Accordingly, the motor 22 starts rotation (step S22).

When the motor 22 is driven as described above, the ball screw 26 is rotated by the aid of the coupling member 24 (see FIG. 2). Accordingly, the rotary motion of the ball screw 26 is converted into the rectilinear motion by the aid of the feed nut 28, and the feed nut 28 is linearly displaced. As a result, the slide table 14 is moved along the guide members 38a, 38b in accordance with the rotation of the motor 22. In this embodiment, the end of the wall for constructing the hole 20 is closed by the cylindrical member 32. The ball screw 26 is surrounded by the cylindrical member 32, and it is not exposed to the outside. Therefore, it is possible to prevent the ball screw 26 from adhesion of dust or the like.

The motor control unit 82 detects the signal from the optical sensor switch 48 as the starting point switch to judge whether or not the slide table 14 is restored to the starting point position (step S23). If the shielding member 52 is not inserted into the space between the light-emitting section 50a and the light-receiving section 50b of the optical sensor switch 48, then the optical sensor switch 48 is turned ON, and the motor control unit 82 detects that the slide table 14 is not restored to the starting point position. Accordingly, the starting point position-restoring return routine comes to an end, and the routine returns to the step S1 (see FIG. 10).

The routine proceeds to the steps S1, S4, and S6 in the same manner as described above, and the routine proceeds to the starting point position-restoring return routine again. Accordingly, the signal line BUSY maintains "1" (step S21), the motor 22 continues the rotation (step S22), and the slide table 14 continues the movement.

If the shielding member 52 is inserted into the space between the light-emitting section 50a and the light-receiving section 50b of the optical sensor switch 48 in accordance with the movement action of the slide table 14, the optical sensor switch 48 is turned OFF. The signal for this fact is transmitted from the connector 64 to the switch input unit 86. The motor control unit 82 detects that the slide table 14 has been moved to the starting point position (step S23). The detection allows the motor drive unit 84 to stop the rotation of the motor 22 (step S24). During this process, the slide table 14 cannot be stopped immediately due to inertia, and it causes overrun to exceed the starting point position in some cases. Accordingly, the motor drive unit 84 reverses the motor 22 to displace the slide table 14 in the opposite direction in a certain range so that the overrun is absorbed to restore the slide table 14 to the starting point position (step S25, Region 100c).

As described above, the slide table 14 is stopped at the starting point position on the basis of the signal outputted from the optical sensor switch 48. Therefore, for example, it is possible to avoid breakage of the motor 22, the ball screw 26, and the feed nut 28, which would be otherwise caused due to possible displacement of the slide table 14 in the same direction exceeding the starting point position.

If the slide table 14 is displaced to the starting point position as described above, then the motor control unit 82 allows the signal line BUSY of the control input/output unit 74 to have "0", and it allows the signal line SET-ON to have "1" (step S26). Further, the same signals as those for the signal lines POINT1 to POINT4 are outputted to the signal lines OUT1 to OUT4 (step S27). Accordingly, the controller 70 detects that the slide table 14 has been moved to the starting point position (Region 100d).

Next, explanation will be made with reference to FIG. 15 for the method for displacing the slide table 14 to the arrival target position stored in any one of the memories 98a to 98d of the memory groups 96b to 96h of the positional information storage unit 92.

Figure 15:
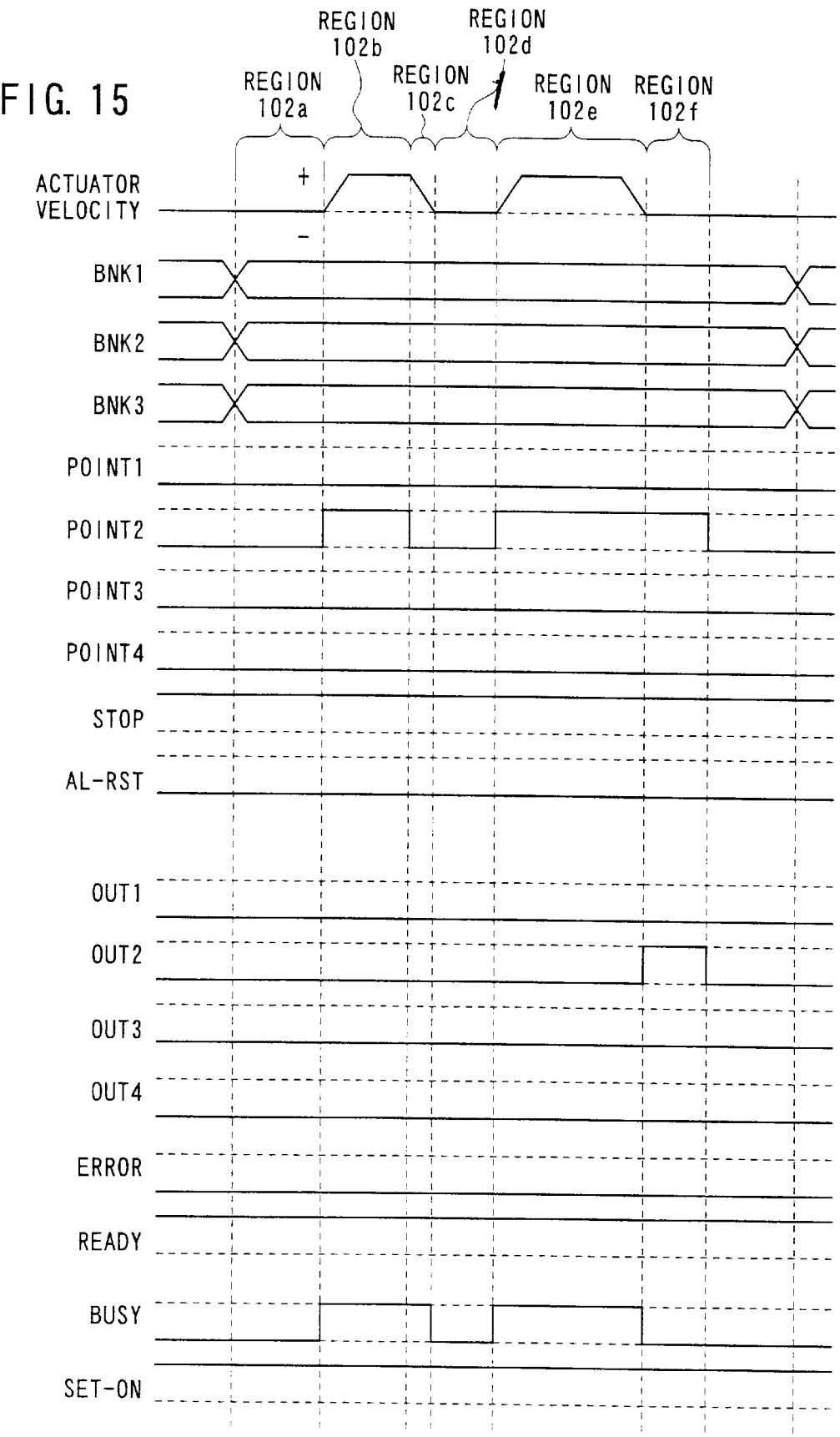
FIG. 15 shows the method for controlling the electric actuator according to the embodiment of the present invention, illustrating a time chart to depict a procedure for displacing the slide table to a predetermined position.

At first, the controller 70 allows the signal lines BNK1 to BNK3 of the control input/output unit 74 to have a predetermined value of "0" or "1" to select any one of the memory groups 96b to 96h of the positional information storage unit 92 (see Region 102a in FIG. 15, FIG. 8, and FIG. 9). Subsequently, if necessary information is stored in the memory 98b, the signal line POINT2 is allowed to have "1" to select the memory 98b (Region 102b). Since all of the signal lines POINT1 to POINT4 do not have "0" in the step S1, the routine proceeds to the step S4. Further, since all of the signal lines BNK1 to BNK3 do not have "0", the routine proceeds to a memory storage position-attaining movement routine (step S5). The motor control unit 82 allows the signal line BUSY of the control input/output unit 74 to have "1" to indicate for the controller 70 that the control operation for the electric actuator 10 is started (step S31 in FIG. 12). The motor drive unit 84 is controlled in order to displace the slide table 14 to the position stored in the memory 98b. The motor drive unit 84 outputs a drive pulse signal to the motor 22 of the electric actuator 10. Accordingly, the motor 22 starts rotation (step S32). At this time, the motor control unit 82 counts the number of pulses of the drive pulse signal outputted from the motor drive unit 84 to the motor 22. Therefore, it is possible for the motor control unit 82 to detect the displacement position of the slide table 14.

The motor control unit 82 compares the displacement position of the slide table 14 with the position stored in the memory 98b (step S33). If the both are not coincident with each other, then the memory storage position-attaining movement routine comes to an end, and the routine returns to the step S1 (see FIG. 10). The routine proceeds to the steps S1 and S4 in the same manner as described above, and the routine proceeds to the memory storage position-attaining movement routine again. Accordingly, the signal line BUSY maintains "1" (step S31), the motor 22 continues the rotation (step S32), and the slide table 14 continues the movement as well.

If the signal line POINT2 is allowed to have "0" (Region 102c) before the slide table 14 arrives at the position stored in the memory 98b, the motor control unit 82 detects in the step S1 that all of the signal lines POINT1 to POINT4 have "0" to stop the rotation of the motor 22 by the aid of the motor drive unit 84 (step S2). If the motor 22 is stopped, the motor control unit 82 allows the signal line BUSY to have "0" (step S3, Region 102d).

If the signal line POINT2 is allowed to have "1" again (Region 102e), then the motor control unit 82 allows the signal line BUSY to have "1" in the step S31, and the motor 22 is rotated in the step S32. Accordingly, the slide table 14 is moved again toward the position stored in the memory 98b.

If the displacement position of the slide table 14 is coincident with the position stored in the memory 98b (step S33), the motor control unit 82 stops the rotation of the motor 22 (step S34, Region 102f). Accordingly, the slide table 14 stops at the position stored in the memory 98b. The motor control unit 82 allows the signal line BUSY to have "0" to indicate for the controller 70 that the slide table 14 has been displaced to the predetermined position (step S35). The same signals as those for the signal lines POINT1 to POINT4 are outputted to the signal lines OUT1 to OUT4 (step S36).

Next, explanation will be made with reference to FIG. 16 for the method for continuously moving the slide table 14 in a predetermined direction regardless of the position stored in the positional information storage unit 92.

At first, the controller 70 allows the signal lines BNK1 to BNK3 of the control input/output unit 74 to have "0" to select the memory group 96a of the positional information storage unit 92 (see Region 104a in FIG. 16, FIG. 8, and FIG. 9). Subsequently, the signal line POINT 2 is allowed to have "1" to select the memory 98b, i.e., the positive direction movement memory 99b (Region 104b). The motor control unit 82 detects in the step S1 that all of the signal lines POINT1 to POINT4 do not have "0", and the routine proceeds to the step S4. Further, it is detected that all of the signal lines BNK1 to BNK3 have "0", and the routine proceeds to the step S6. Since the controller 70 does not select the starting point memory 99a, the routine proceeds to the step S8. Since the positive direction movement memory 99b is selected, the routine proceeds to a positive direction movement routine (step S9).

Figure 13:
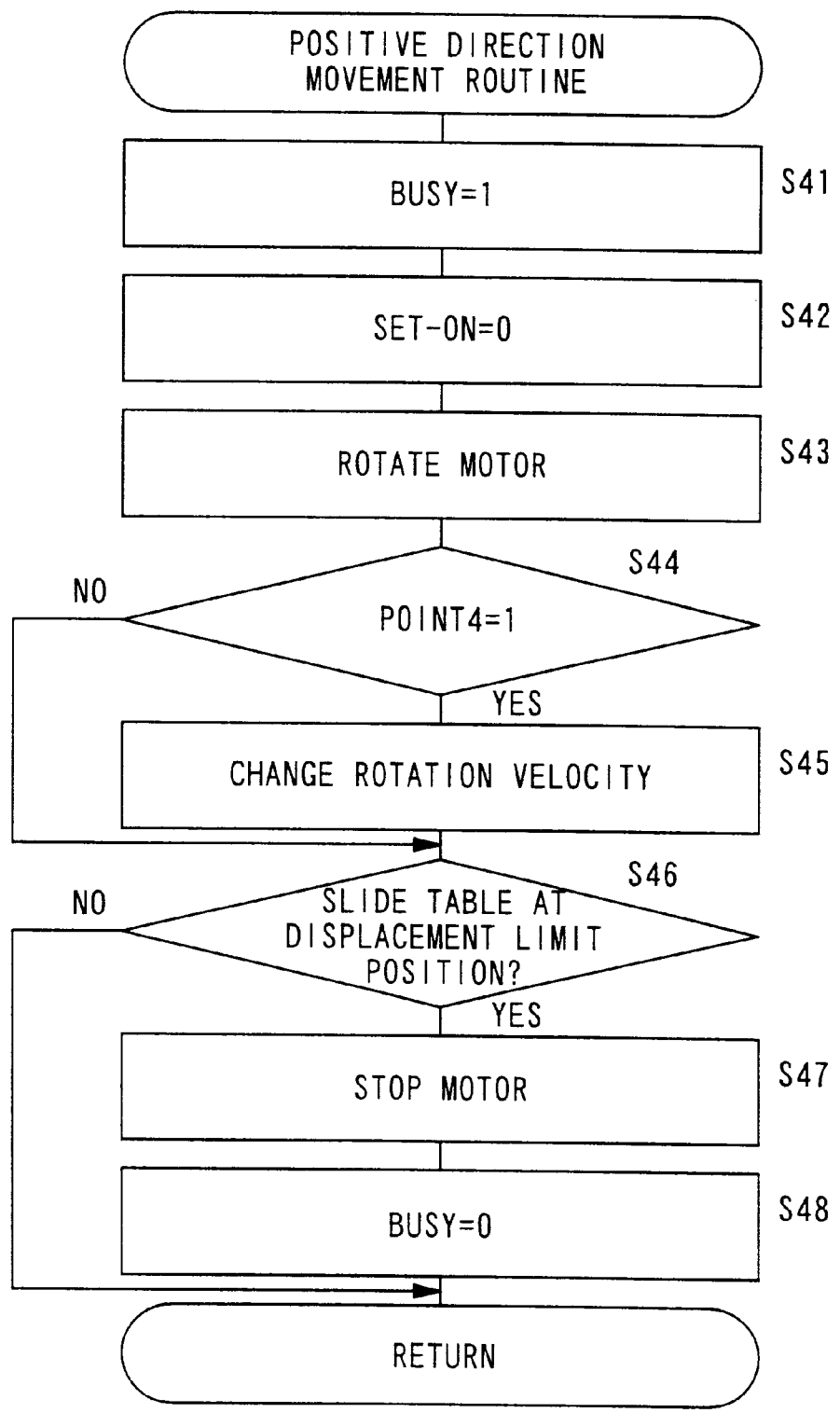
FIG. 13 shows the method for controlling the electric actuator according to the embodiment of the present invention, illustrating a flow chart of a positive direction movement routine.

The motor control unit 82 allows the signal line BUSY of the control input/output unit 74 to indicate for the controller 70 that the control operation for the electric actuator 10 is started (step S41 in FIG. 13). The signal line SET-ON is allowed to have "0" to indicate that the slide table 14 makes continuous movement regardless of the positional information stored in the positional information storage unit 92 (step S42). The motor drive unit 84 is controlled in order to displace the slide table 14 in the positive direction, i.e., in the direction to make separation from the starting point position. The motor drive unit 84 outputs a drive pulse signal to the motor 22 of the electric actuator 10. Accordingly, the motor 22 starts rotation (step S43).

If the motor 22 is driven as described above, the slide table 14 is moved in the positive direction along the guide members 38a, 38b in accordance with the rotation of the motor 22 in the same manner as described above.

The motor control unit 82 judges whether or not the signal line POINT4 has "1" (step S44). If the signal line POINT4 has "1", it is judged that the velocity information memory 99d is selected. The motor control unit 82 controls the velocity of rotation of the motor 22 to be a velocity of rotation stored in the velocity information memory 99d (step S45, Region 104c). Accordingly, the velocity of movement of the slide table 14 is changed.

Subsequently, the motor control unit 82 detects the signal supplied from the magnetic detection switch 18 as the displacement limit-detecting switch to judge whether or not the slide table 14 has arrived at the displacement limit position (step S46). If the magnet 30 provided on the feed nut 28 does not approach the magnetic detection switch 18, the magnetic detection switch 18 is not turned ON. Accordingly, the positive direction movement routine comes to an end, and the routine returns to the step S1 (see FIG. 10).

If the signal line POINT2 is allowed to have "0", the motor control unit 82 judges that the signal lines POINT1 to POINT4 do not have "0" in the step S1 to stop the rotation of the motor 22 (step S2, Region 104d). Accordingly, the movement of the slide table 14 is stopped. The motor control unit 82 allows the signal line BUSY to have "0" (step S2, Region 104e).

If the signal line POINT2 does not have "0", and the slide table 14 continues movement in the positive direction, then the magnet 30 provided on the feed nut 28 approaches the magnetic detection switch 18, and the magnetic detection switch 18 is turned ON. The signal for this fact is transmitted from the connector 64 to the switch input unit 86. The motor control unit 82 detects that the slide table 14 has arrived at one displacement limit. At this time, the slide table 14 cannot make any more movement. Therefore, if the motor 22 continues the rotation, for example, there is a fear of increase in load on the motor 22, the ball screw 26, and the feed nut 28, resulting in breakage. Accordingly, if the motor control unit 82 detects that the magnetic detection switch 18 is turned ON in the step S46, the rotation of the motor 22 is stopped to avoid, for example, breakage of the motor 22, the ball screw 26, and the feed nut 28 (step S47). The signal line BUSY is allowed to have "0" (step S48).

If the slide table 14 is displaced in the negative direction, i.e., in the direction to approach the starting point position, the signal line POINT3 is allowed to have "1" to select the negative direction movement memory 99c. Accordingly, the motor control unit 82 judges that the negative direction movement memory 99c is selected in the step S10, and the routine proceeds to a negative direction movement routine (step S11). The negative direction movement routine is operated in the same manner as in the positive direction movement routine, detailed explanation of which will be omitted.

The malfunction detection switch 88 is operated as follows. That is, for example, if the optical sensor switch 48 or the magnetic detection switch 18 is turned ON when the slide table 14 of the electric actuator 10 is at a position different from those obtained during normal operation, it is judged that any abnormality occurs in the electric actuator 10 to output a signal indicating this fact to the motor control unit 82. In consequence, the motor control unit 82 stops the rotation of the motor 22. The signal line ERROR is allowed to have "1" to indicate this abnormality to the controller 70.

According to the embodiment of the present invention, it is unnecessary to provide any dedicated signal line to be used for the starting point restoration signal for the control apparatus 60. Therefore, it is possible to decrease the number of signal lines to make connection between the control apparatus 60 and the controller 70. If the number of signal lines is not decreased, the dedicated signal line can be used as a signal line for indicating the positional information, making it possible to set a larger number of stop positions at which the displacement member 36 can be stopped by using the control apparatus 60.

When the displacement member 36 arrives at the starting point or the displacement limit, the control apparatus 60 can detect this fact by the aid of the optical sensor switch 48 and the magnetic detection switch 18 to stop the electric actuator 10. It is possible to avoid any increase in load on the electric actuator 10, and it is possible to eliminate any fear of breakage of the electric actuator 10.

What is claimed is:

1. A control method for controlling an electric actuator in which rotary motion of a driving force-transmitting shaft energized by a motor is converted into rectilinear motion to displace a displacement member in accordance with an action of said rectilinear motion, said control method comprising the steps of:

judging whether or not a starting point memory, which is provided in memory groups composed of a plurality of memories for storing arrival target positions of said displacement member, is selected so that said displacement member is displaced toward a starting point position if said starting point memory is selected; and stopping said displacement member if a signal, which indicates that said displacement member has been moved to a starting point disposed at one end of said electric actuator, is outputted from a starting point-detecting switch.

2. The control method for controlling said electric actuator according to claim 1, further comprising the steps of:

judging whether or not a positive direction movement memory, which is provided in said memory groups, is selected so that said displacement member is displaced in a direction to make separation from said starting point position if said positive direction movement memory is selected; and stopping said displacement member if a signal, which indicates that said displacement member has been moved to an end of said electric actuator opposite to said starting point, is outputted from a displacement limit-detecting switch.

3. The control method for controlling said electric actuator according to claim 1, further comprising the steps of:

judging whether or not a negative direction movement memory, which is provided in said memory groups, is selected so that said displacement member is displaced in a direction to make approach to said starting point position if said negative direction movement memory is selected; and stopping said displacement member if a signal, which indicates that said displacement member has been moved to said starting point, is outputted from said starting point-detecting switch.

4. The control method for controlling said electric actuator according to claim 1, further comprising the step of:

judging whether or not a velocity information memory, which is provided in said memory groups, is selected so that said displacement member is displaced at a velocity stored in said velocity information memory if said velocity information memory is selected.

5. The control method for controlling said electric actuator according to claim 1, wherein said displacement member is displaced in an opposite direction after said step of stopping said displacement member so that overrun of said displacement member is absorbed.

6. A control apparatus for controlling an electric actuator in which rotary motion of a driving force-transmitting shaft energized by a motor is converted into rectilinear motion to displace a displacement member in accordance with an action of said rectilinear motion, said control apparatus comprising:

a plurality of memory groups each of said memory groups being composed of a plurality of memories for storing positional information on said displacement member;

a starting point memory provided in one of said memory groups, for storing a starting point position to restore said displacement member to a starting position;

means for judging whether or not said starting point memory is selected, wherein said displacement member is displaced toward said starting point position if said starting point memory is selected; and a starting point-detecting switch for detecting that said displacement member has been moved to a starting point disposed at one end of said electric actuator, wherein said displacement member is stopped when a signal is outputted from said starting point detecting switch.

7. The control apparatus for controlling said electric actuator according to claim 6, further comprising:

a positive direction movement memory and a negative direction movement memory provided, respectively, in one of said memory groups; and means for judging whether or not said positive direction movement memory or said negative direction movement memory is selected, wherein said displacement member is displaced in a direction to make separation from said starting point position if said positive direction movement memory is selected, and said displacement member is displaced in a direction to approach said starting point position if said negative direction movement memory is selected.

8. The control apparatus for controlling said electric actuator according to claim 6, further comprising:

a velocity information memory provided in one of said memory groups for indicating a displacement velocity of said displacement member; and means for judging whether or not said velocity information memory is selected, wherein said displacement member is displaced at a velocity stored in said velocity information memory if said velocity information memory is selected.

9. The control apparatus for controlling said electric actuator according to claim 6, further comprising:

signal lines for selecting any one of said memory groups; and signal lines for selecting any one of said memories from said memory groups.

10. A control apparatus for controlling an electric actuator in which rotary motion of a driving force-transmitting shaft energized by a motor is converted into rectilinear motion to displace a displacement member in accordance with an action of said rectilinear motion, said control apparatus comprising:

- a starting point-detecting switch for detecting that said displacement member has been moved to a starting point disposed at one end of said electric actuator;
- a displacement limit-detecting switch for detecting that said displacement member has been moved to another end of said electric actuator opposite from said one end;
- a switch input unit connected, respectively, to said starting point-detecting switch and said displacement limit-detecting switch; and
- a malfunction detection switch connected to said switch input unit, for detecting any abnormality caused in said electric actuator,
- wherein said electric actuator is controlled on the basis of signals inputted from said starting point-detecting switch, said displacement limit-detecting switch and said malfunction detection switch into said switch input unit.

11. A control apparatus for controlling an electric actuator in which rotary motion of a driving force-transmitting shaft energized by a motor is converted into rectilinear motion to displace a displacement member in accordance with an action of said rectilinear motion, said control apparatus comprising:

- a starting point-detecting switch for detecting that said displacement member has been moved to a starting point disposed at one end of said electric actuator;
- a displacement limit-detecting switch for detecting that said displacement member has been moved to another end of said electric actuator opposite from said one end;
- a switch input unit connected, respectively, to said starting point-detecting switch and said displacement limit-detecting switch;
- a positive direction movement memory and a negative direction movement memory; and
- means for judging whether one of said positive direction movement memory or said negative direction movement memory is selected, wherein said displacement member is displaced in a direction to make separation from said starting point position if said positive direction movement memory is selected, and said displacement member is displaced in a direction to approach said starting point position if said negative direction movement memory is selected,
- wherein said electric actuator is controlled on the basis of signals inputted from said starting point-detecting switch and said displacement limit-detecting switch into said switch input unit, and
- wherein said displacement member is stopped if one of a signal from said displacement limit-detecting switch or a signal from said starting point-detecting switch is input to said switch input unit.

* * * * *